No. 688,721. Patented Dec. 10, 1901.
A. DERVAUX.
METHOD OF PURIFYING WATER.
(Application filed Dec. 1, 1896.)
(No Model.)
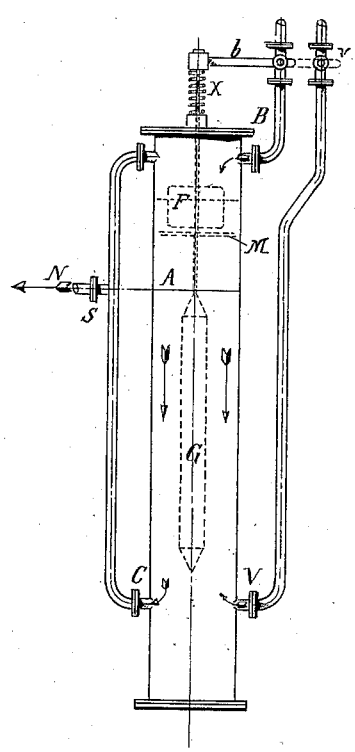
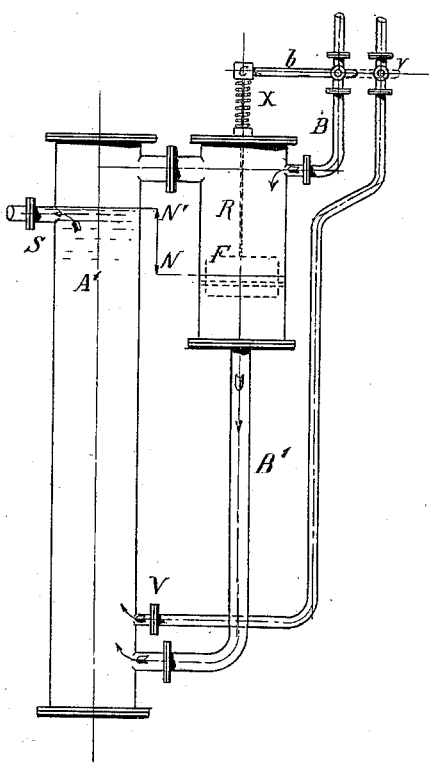
WITNESSES
INVENTOR:
A. Dervaux.
BY
ATTORNEYS

UNITED STATES PATENT OFFICE.

ALFRED DERVAUX, OF BRUSSELS, BELGIUM.

METHOD OF PURIFYING WATER.

SPECIFICATION forming part of Letters Patent No. 688,721, dated December 10, 1901.

Application filed December 1, 1896. Serial No. 614,113. (No specimens.)

*To all whom it may concern:*

Be it known that I, ALFRED DERVAUX, of Brussels, Belgium, have invented a new and useful Improvement in Methods of Purifying Water, (patented in France, No. 256,006, dated May 2, 1896,) of which the following is a full, clear, and exact description.

Calcareous water may, as is well known, be purified by boiling it, whereby carbonic acid is liberated and at the same time a precipitation of carbonate of lime takes place.

My present invention relates to the purification of water by the ebullition process above indicated, and has for its object to provide certain improvements whereby a thorough and easily-regulated physical and chemical action is obtained.

The details and novel features of the invention will be fully set forth in the description following hereinafter and in the appended claim.

Reference is to be had to the accompanying drawings, forming a part of this specification, in which the two figures represent sectional elevations of two different apparatus, such as may be employed in carrying out my invention.

As illustrated in Figure 1, the apparatus consists of a narrow elongated receptacle A, placed upright and preferably of cylindrical shape. Said receptacle is open to the atmosphere at its upper end and has near its top a water-supply pipe B, so that the water entering the apparatus travels downward therein, while steam is admitted at the bottom through a pipe V and rises in the descending column of water, causing the same to boil under atmospheric pressure. The water leaves the receptacle through the connection C, from which the boiled and purified water rises through the discharge-pipe S to the outlet N. The water in the pipe S, being no longer subjected to the heating action of the steam, does not boil, and consequently forms a column of constant weight. According to the laws of equilibrium in communicating tubes the column of boiling water in the receptacle A must also be of constant weight. Inasmuch, however, as boiling water is of less specific gravity than cooler water, the water in the receptacle A will rise more or less above the level of the outlet N. It will be observed that the office of the column of water in the discharge-pipe S is to create a backward or upward pressure upon the water in the receptacle A, so as to cause this boiling water to rise to a predetermined level.

By giving the receptacle A a narrow form, as described, the descending water is caused to form superposed layers, which are successively heated to the boiling-point by the ascending column of steam. These layers as they are in a constant progressive movement toward the outlet do not mix with each other, but arrive at the discharge-pipe S successively and all purified to the same degree. Moreover, while the lower strata of the descending column of water are subjected to ebullition under atmospheric pressure, the steam rising through them carries along the carbonic acid contained therein, and then becomes condensed while gradually heating the cooler middle and upper layers of the descending column of water. As referred to at the beginning of this specification, the boiling of calcareous water causes a liberation of carbonic-acid gas and a precipitation of carbonate of lime. The gas rises through the column of water and escapes at the top thereof into the atmosphere. The carbonate is held in suspension in the water and passes out with the same through the discharge-pipe S. The separation of the precipitate is then effected by any of the usual means, such as settling. It will be obvious that if the amounts of water and steam supplied are properly proportioned the uppermost layer of water will remain cool, the steam being fully condensed before it reaches the surface of the liquid, so that no steam will be lost, but its heat will be fully utilized.

In order that the supply of water and steam may be regulated to secure the above-indicated result, the pipes B and V are provided with valves $b$ and $v$, which can be adjusted manually, if desired, or an automatic adjustment may be obtained as follows: In the boiling column of water I arrange either a float F or an areometer G, connected by means of a suitable lever or equivalent mechanism with either the valve $b$ or the valve $v$. The valve not controlled by the float or areometer is adjusted manually and does not change its position unless so adjusted. The areometer falls in case the water becomes specifically too light in consequence of too active boiling, and the valve-operating lever is so arranged that in such a case it will reduce the amount of steam admitted or increase the amount of water. The float under like circumstances will move in the opposite direction—that is, it will rise when the water boils too violently and will be connected with the valve b or with the valve v to produce the same result, as above described. By means of a spring X, bearing against the receptacle A and against a collar which is adjustable upon the spindle of the areometer or float, the proper normal position of the float or areometer may be readily secured. The same result may of course be obtained by employing floats or areometers of different weights. It will be observed that the float or areometer when connected to the water-supply valve b opens the same when the level of the water rises and closes the valve when the water-level falls. This is just the reverse of the operation of ordinary water-level regulators. In my invention, however, the conditions are quite different from those obtaining in a water-level regulator. The quantity and weight of the water contained in the receptacle A are determined by the upright discharge-pipe S. The quantity and weight of the boiling water, therefore, needs no regulation. The float or areometer merely regulates the intensity of the boiling action, and this function is made possible by the elongated shape of the receptacle, which creates a very intense ebullition, and thus considerably reduces the density of the water, causing the surface of said water to rise correspondingly above the level of the outlet N. A diaphragm M may be employed to protect the float F from the bubbling action of the boiling water.

In Fig. 2 both water and steam are admitted at the bottom of the receptacle A through the pipes B and V, respectively, having valves b and v, either of which may be controlled by the areometer G, as above described. The boiling water rises with the steam to the discharge-pipe S, it being understood that the steam is fully condensed before it reaches the surface of the water.

When it is desired to employ a float F instead of the areometer, said float is arranged in a separate vessel R, connected with the water-supply pipe B and through its medium with the boiling-receptacle A. The normal height or level N of the float is so adjusted relatively to the level N' of the discharge-pipe S that the difference of the levels N N' corresponds to a predetermined reduction of the density of the water, said reduction depending, of course, upon the intensity of the ebullition.

I claim as my invention—

The herein-described method of purifying water, which consists in imparting a continuous downward movement to a narrow body or column of water exposed to the atmosphere at the top introducing steam at the bottom of said column and causing said steam to pass upward to first come in contact with the lower strata of the water and cause them to boil and to expand so that their density is reduced, and subsequently in contact with the constantly-renewed cooler upper strata of the water so that the steam will be condensed thereby before reaching the upper surface of the water column, thus avoiding all loss of steam at the surface, the method consisting further in causing the water, after its arrival at the point where steam is admitted, to travel upward in a path different from that of the steam and out of contact therewith, the water in said upward current thus resuming a constant density, the upwardly-flowing water column forming a counterbalance which will keep the downwardly-moving column of a constant weight, while the density and height or level of said downwardly-moving column will vary with the intensity of the boiling action, and utilizing the variations of the level of said column for regulating the proportion of water and steam supplied and thus governing the intensity of the boiling action.

In testimony whereof I have signed this specification in the presence of two subscribing witnesses.

ALFRED DERVAUX.

Witnesses:
 ANDRÉ HEGENMÜLLER,
 GUSTAVE TIERRS.